United States Patent
Ishii

(10) Patent No.: US 12,291,300 B2
(45) Date of Patent: May 6, 2025

(54) VEHICLE FRONT STRUCTURE WITH HEADLIGHT COWL BRACE

(71) Applicant: SUZUKI MOTOR CORPORATION, Hamamatsu (JP)

(72) Inventor: Tatsuki Ishii, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 18/748,505

(22) Filed: Jun. 20, 2024

(65) Prior Publication Data
US 2024/0425132 A1   Dec. 26, 2024

(30) Foreign Application Priority Data
Jun. 23, 2023 (JP) ................................ 2023-103326

(51) Int. Cl.
*B62J 6/027* (2020.01)
*B60Q 1/04* (2006.01)
*B62J 17/02* (2006.01)
*B62K 11/04* (2006.01)

(52) U.S. Cl.
CPC ............ *B62J 6/027* (2020.02); *B60Q 1/0483* (2013.01); *B62J 17/02* (2013.01); *B62K 11/04* (2013.01)

(58) Field of Classification Search
CPC . B62J 6/027; B62J 17/02; B62J 17/04; B60Q 1/0483; B62K 11/04
See application file for complete search history.

(56) References Cited

U.S. PATENT DOCUMENTS

| | | | |
|---|---|---|---|
| 7,331,322 B2 * | 2/2008 | Seki | F02M 35/10255 123/184.21 |
| 2022/0111921 A1 * | 4/2022 | Ishii | B62J 50/20 |
| 2022/0324528 A1 | 10/2022 | Ikeda | B62J 6/022 |

FOREIGN PATENT DOCUMENTS

| | | | | |
|---|---|---|---|---|
| JP | 3663930 B2 | 4/2005 | | |
| JP | 2009202803 A * | 9/2009 | | |
| JP | 4527015 B2 | 8/2010 | | |
| JP | 2016-179792 A | 10/2016 | | |
| JP | 2019119441 A * | 7/2019 | | B62J 17/00 |

OTHER PUBLICATIONS

Atsuji, Front Cowl and Wind Screen Fitting Structure of Motorcycle, JP2009202803A, 2009, https://worldwide.espacenet.com/patent/search/family/041145488/publication/JP2009202803A?q=pn%3DJP2009202803A (Year: 2009).*

(Continued)

*Primary Examiner* — Tracie Y Green
*Assistant Examiner* — Michael Chiang
(74) *Attorney, Agent, or Firm* — Stein IP, LLC

(57) ABSTRACT

A vehicle front structure for a straddle-type vehicle is provided. The straddle-type vehicle includes a headlight installed in a vehicle front. The vehicle front structure includes: a front cowl configured to cover a periphery of the headlight and having a lower surface with an opening; a cowl brace configured to support an inner side of the front cowl from a vehicle rear side; and a lower cover configured to cover the opening of the front cowl below the headlight. A front part of the lower cover is mounted to a lower edge of the front cowl, and a rear part of the lower cover is mounted to a lower portion of the cowl brace.

5 Claims, 8 Drawing Sheets

(56) References Cited

OTHER PUBLICATIONS

Suzuki, Front Cowl Structure of Saddle-Riding Type Vehicle, JP2019119441A, 2019, https://worldwide.espacenet.com/patent/search/family/067188632/publication/JP2019119441A?q=pn%3DJP2019119441A (Year: 2019).*

Extended European Search Report dated Dec. 6, 2024, issued by the European Patent Office in corresponding application EP 24183503.2.

* cited by examiner

VEHICLE FRONT STRUCTURE WITH HEADLIGHT COWL BRACE

CROSS-REFERENCE TO RELATED APPLICATIONS

This application is based on and claims priority under 35 USC 119 from Japanese Patent Application No. 2023-103326 filed on Jun. 23, 2023, the contents of which are incorporated herein by reference.

TECHNICAL FIELD

The present disclosure relates to a vehicle front structure.

BACKGROUND ART

In a full cowl model, an opening for maintenance may be formed in a lower surface of a front cowl. For example, JP3663930B2 discloses a full cowl model in which a lower cover is mounted to an opening edge of the front cowl by a resin clip or the like, and the opening in the lower surface of the front cowl is covered with the lower cover to improve aerodynamic performance. At the time of maintenance, the lower cover is removed from the opening edge of the front cowl, and an operator inserts his or her hand through the opening of the front cowl to adjust an optical axis of a headlamp, to adjust a steering damper, and the like.

SUMMARY OF INVENTION

However, in JP3663930B2, although a front part of the lower cover is fixed, a rear part of the lower cover is not fixed. The lower cover needs to cover a wide range, and weight reduction is achieved by making the lower cover thinner. For this reason, the rigidity of the lower cover becomes low, and there is a possibility that the lower cover may hang down due to its own weight and contact other components.

The present disclosure has been made in view of the above circumstances, and an object thereof is to provide a vehicle front structure that can improve the rigidity of a lower cover in a full cowl model.

The present disclosure provides a vehicle front structure for a straddle-type vehicle, the straddle-type vehicle including a headlight installed in a vehicle front, the vehicle front structure including: a front cowl configured to cover a periphery of the headlight and having a lower surface with an opening; a cowl brace configured to support an inner side of the front cowl from a vehicle rear side; and a lower cover configured to cover the opening of the front cowl below the headlight, in which: a front part of the lower cover is mounted to a lower edge of the front cowl, and a rear part of the lower cover is mounted to a lower portion of the cowl brace.

According to the vehicle front structure of one aspect of the present disclosure, the front and rear parts of the lower cover are supported by the front cowl and the cowl brace, so that the rigidity of the lower cover is improved. The cowl brace having high rigidity can prevent the lower cover from hanging and prevent contact between the lower cover and other components.

BRIEF DESCRIPTION OF DRAWINGS

The present disclosure will be described in detail based on the following without being limited thereto, wherein.

DESCRIPTION OF EMBODIMENTS

A headlight is installed in a vehicle front of a straddle-type vehicle according to an aspect of the present disclosure. In a vehicle front structure of the straddle-type vehicle, an inner side of a front cowl is supported by a cowl brace from a vehicle rear side, and a periphery of the headlight is covered by the front cowl. A lower surface of the front cowl has an opening, and the opening of the front cowl is covered by a lower cover below the headlight. A front part of the lower cover is mounted to a lower edge of the front cowl, and a rear part of the lower cover is mounted to a lower portion of the cowl brace. The front and rear of the lower cover are supported by the front cowl and the cowl brace, so that the rigidity of the lower cover is improved. The cowl brace having high rigidity can prevent the lower cover from hanging and prevent contact between the lower cover and other components.

Figure 1:
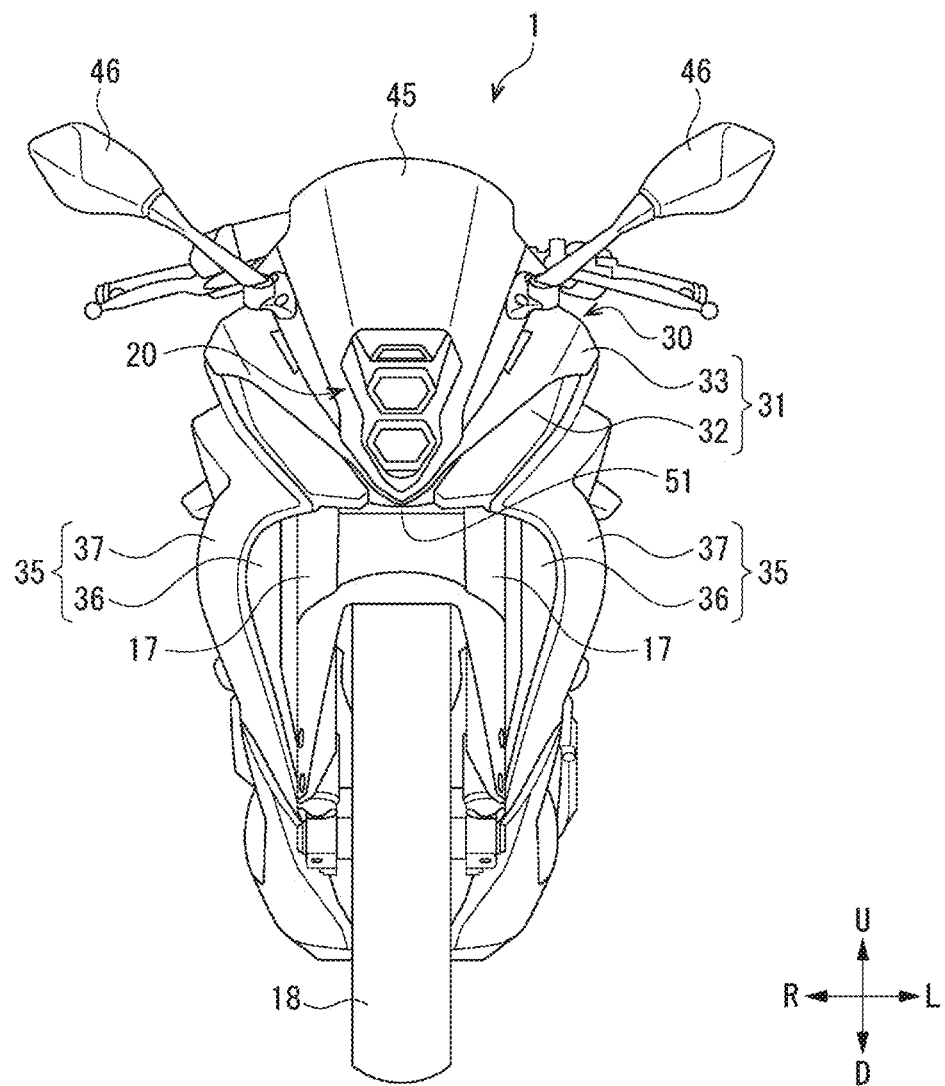
FIG. 1 is a front view of a straddle-type vehicle according to the present embodiment.
Figure 2:
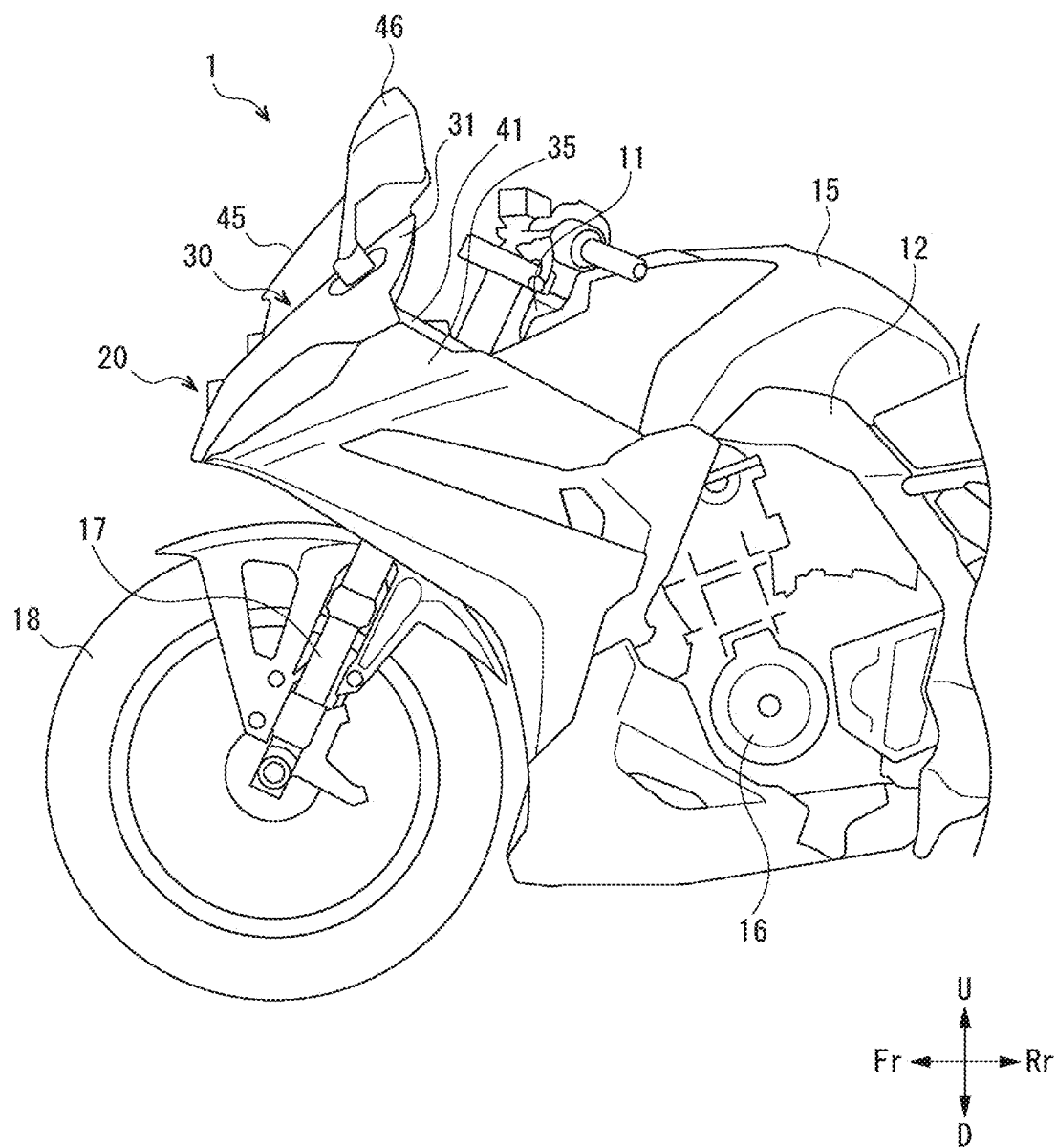
FIG. 2 is a left side view of the straddle-type vehicle according to the present embodiment.

A straddle-type vehicle according to the present embodiment will be described below with reference to the accompanying drawings. FIG. 1 is a front view of a straddle-type vehicle according to the present embodiment. FIG. 2 is a left side view of the straddle-type vehicle according to the present embodiment. In the following drawings, an arrow FR indicates a vehicle front side, an arrow RE indicates a vehicle rear side, an arrow L indicates a vehicle left side, and an arrow R indicates a vehicle right side.

As shown in FIGS. 1 and 2, a headlight 20 is installed in a vehicle front of a straddle-type vehicle 1 at two upper and lower stages. The periphery of the headlight 20 is covered from a front side by a front cowl 30. A head pipe 11 at a front end of a vehicle body frame is located in a rear side of the headlight 20. A pair of main frames 12 extend rearward from the head pipe 11. A fuel tank 15 is installed above the pair of main frames 12, and an engine 16 is supported below the pair of main frames 12. A front fork 17 is supported on the head pipe 11 to be steerable, and a front wheel 18 is rotatably supported on a lower portion of the front fork 17.

A cowl brace 60 (see FIG. 3) is supported on a front surface of the head pipe 11, and an inner side of the front cowl 30 is supported by the cowl brace 60 from the vehicle rear side. The front cowl 30 includes a body cowl 31 and a pair of side cowls 35. The body cowl 31 forms a front surface of the vehicle front, and the pair of side cowls 35 form both side surfaces of the vehicle front. The body cowl 31 has a double structure in which an upper body cowl 33 is placed on a lower body cowl 32, and the pair of side cowls 35 have a double structure in which a pair of outer side cowls 37 are placed on a pair of inner side cowls 36.

A windscreen 45 for wind protection is provided at the center of an upper portion of the body cowl 31, and a pair of mirrors 46 are provided at two positions on the left and right of the body cowl 31 across the windscreen 45. A front surface of the front cowl 30 is formed by the body cowl 31, and the both side surfaces of the front cowl 30 are formed by the pair of side cowls 35. The headlight 20 is covered by the body cowl 31 from the front side, and the headlight 20 is covered by the pair of side cowls 35 from lateral sides. The headlight 20 is covered by a meter panel 41 from an upper side, and the headlight 20 is covered by a lower cover 51 from a lower side.

A lower surface of the front cowl 30 is open, and during maintenance, an optical axis of the headlight 20 is adjusted through the opening. Normally, the opening of the front cowl 30 is covered by the lower cover 51 below the headlight 20, thereby improving aerodynamic performance. If the lower cover 51 is simply mounted to a lower edge of the front cowl 30, a rear surface of the front cowl 30 remains open, and therefore, a rear part of the lower cover 51 may hang down due to its own weight. Therefore, in the present embodiment, a front part and both left and right parts of the lower cover 51 are mounted to the front cowl 30, and the rear part of the lower cover 51 is mounted to the cowl brace 60 having high rigidity to ensure the rigidity of the lower cover 51.

Figure 3:
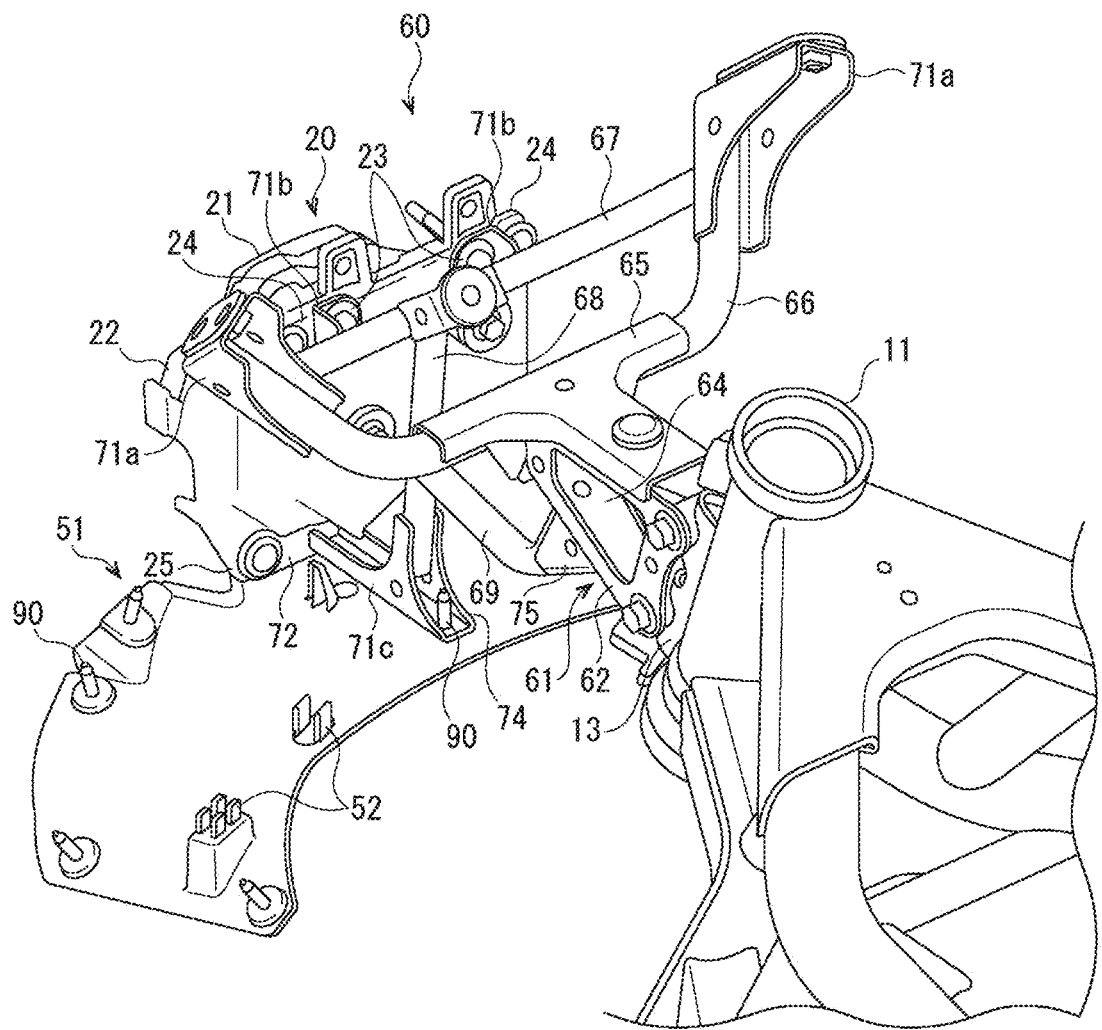
FIG. 3 is a perspective view of a periphery portion of a cowl brace according to the present embodiment.
Figure 4:
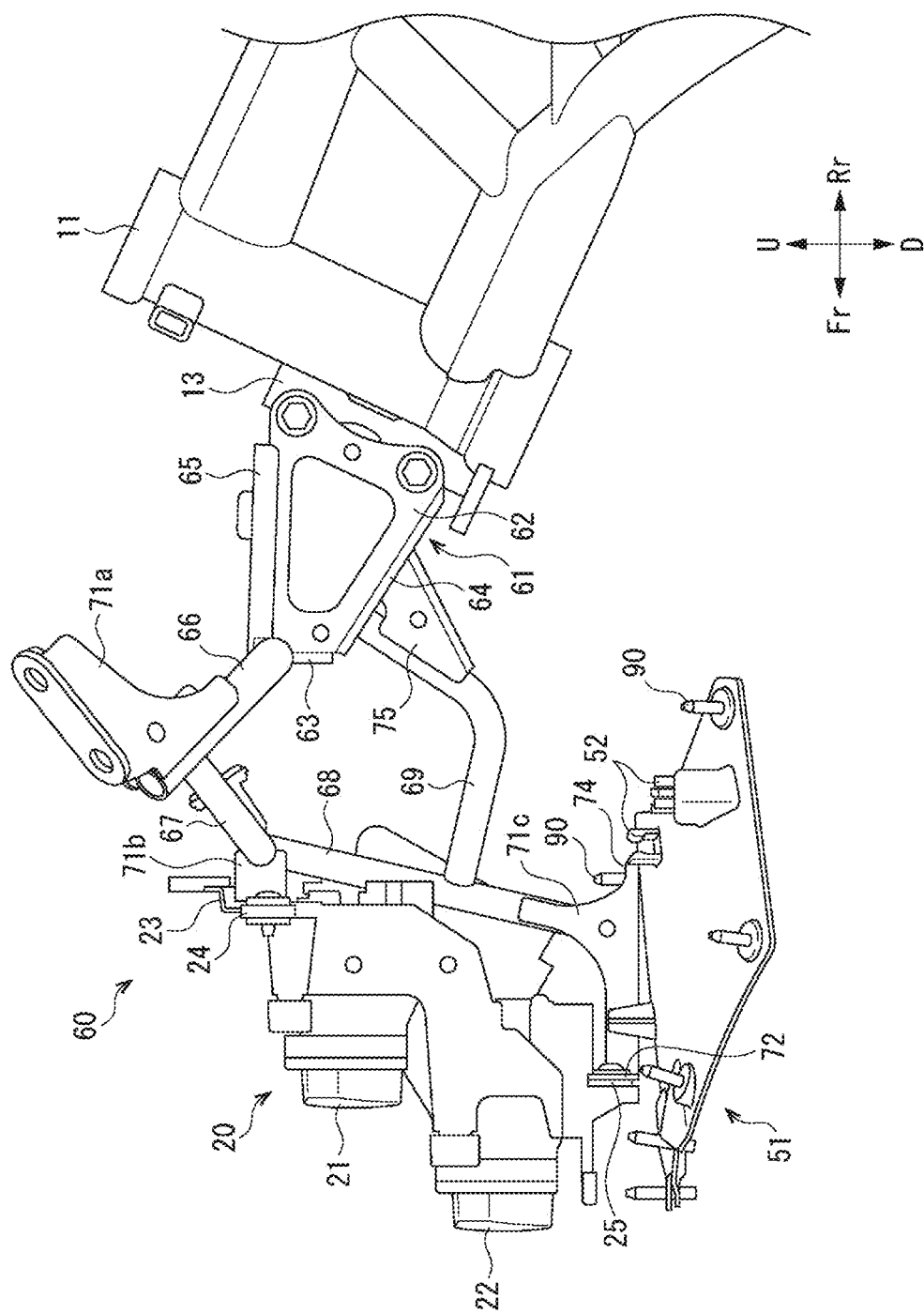
FIG. 4 is a side view of the periphery portion of the cowl brace according to the present embodiment.
Figure 5:
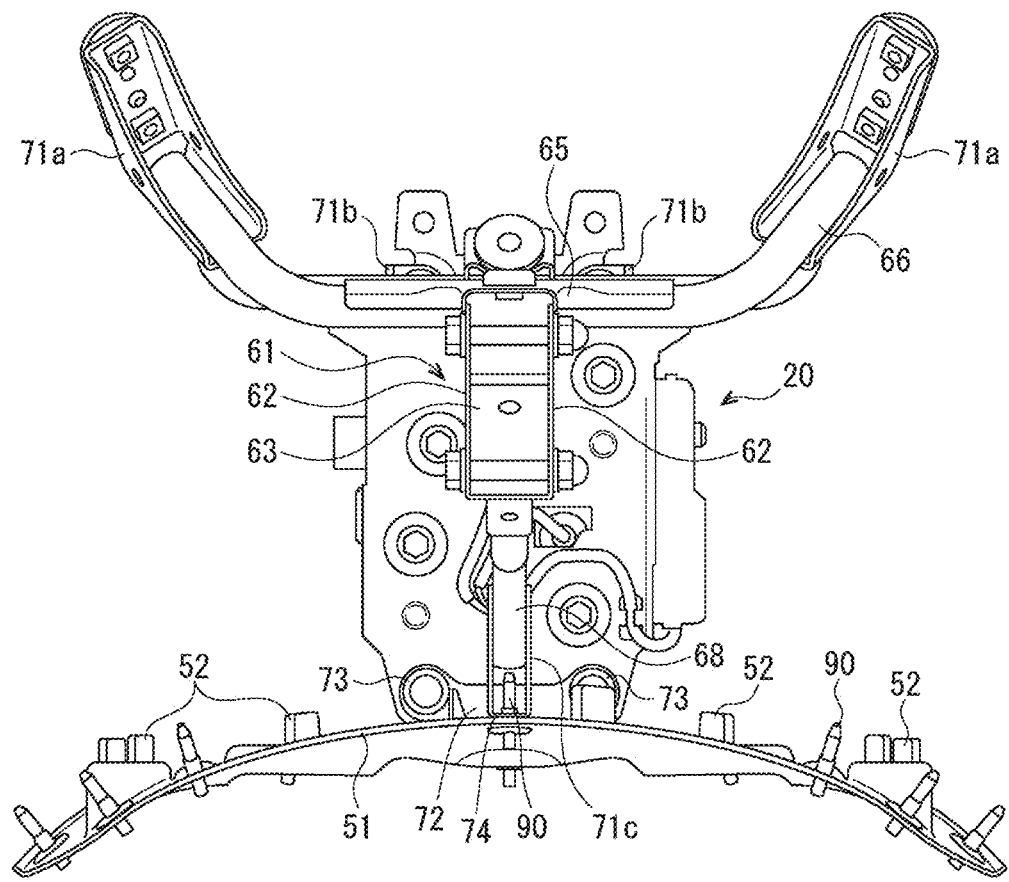
FIG. 5 is a rear view of the periphery portion of the cowl brace according to the present embodiment.

A periphery portion of the cowl brace of the present embodiment will be described with reference to FIGS. 3 to 5. FIG. 3 is a perspective view of the periphery portion of the cowl brace according to the present embodiment. FIG. 4 is a side view of the periphery portion of the cowl brace according to the present embodiment. FIG. 5 is a rear view of the periphery portion of the cowl brace according to the present embodiment. In FIGS. 3 to 5, the front cowl and a meter panel are omitted for convenience of description.

As shown in FIGS. 3 and 4, the cowl brace 60 is made of a metal pipe, a metal bracket, and the like, and forms a framework of the vehicle front in front of the head pipe 11. The head pipe 11 supports the front cowl 30 (see FIG. 1), the headlight 20, and the lower cover 51 via the cowl brace 60. The headlight 20 is formed into two stages, upper and lower, including an upper headlight 21 and a lower headlight 22. A pair of upper mounting portions 23 are formed on an upper portion of the upper headlight 21, and a pair of cowl mounting portions 24 are formed adjacent to the pair of upper mounting portions 23. A pair of lower mounting portions 25 are formed on a lower portion of the lower headlight 22.

The headlight 20 is covered with a lower cover 51 from below. A plurality of insertion holes for clips 90 are formed in the lower cover 51 along a front edge and both side edges. An insertion hole for a clip 90 is also formed at the center of the rear part of the lower cover 51. The insertion holes at the front edge and both side edges of the lower cover 51 serve as mounting portions for the front cowl 30, and the insertion hole at the rear part of the lower cover 51 serves as a mounting portion for the cowl brace 60. A plurality of clamps (holding portions) 52 for winker harnesses 93 (see FIG. 8) are formed on an upper surface of the lower cover 51. As will be described in detail later, an installation surface for electric components is secured on the upper surface of the lower cover 51.

A protruding portion 13 protrudes from the front surface of the head pipe 11, and a frame 61 on the rear side of the cowl brace 60 is fixed to the protruding portion 13 of the head pipe 11. The frame 61 includes a pair of frame plates 62 facing each other across the protruding portion 13 of the head pipe 11, a front plate 63 connecting front edges of the pair of frame plates 62, and a lower plate 64 connecting lower edges of the pair of frame plates 62. A T-shaped bracket 65 is fixed to upper edges of the pair of frame plates 62, and upper surfaces of the pair of frame plates 62 are covered by a vertically long portion of the T-shaped bracket 65. A tip end part of the T-shaped bracket 65 is horizontally long, and a U-shaped upper arm 66 is fixed to front portions of the pair of frame plates 62 via a horizontally long portion of the T-shaped bracket 65.

The upper arm 66 extends from a lateral plate of the T-shaped bracket 65, and extending portions of the upper arm 66 are curved so as to spread forward in a left-right direction. A pair of mounting brackets 71a are fixed to both ends of the upper arm 66, and the mirrors 46 (see FIG. 1) are screwed to the pair of mounting brackets 71a via the front cowl 30. The vicinity of the pair of mounting brackets 71a of the upper arm 66 is connected via an inverted U-shaped curved bridge 67. A pair of mounting brackets 71b are fixed to a front surface of the curved bridge 67 at a predetermined interval, and the upper mounting portions 23 of the headlight 20 are screwed to the pair of mounting brackets 71b.

A down arm 68 extends downward from the middle of the curved bridge 67, and a mounting bracket (support member) 71c is fixed to a lower portion of the down arm 68. The mounting bracket 71c extends in a front-rear direction along the lower cover 51, a horizontally long mounting plate 72 is provided at a front end of the mounting bracket 71c, and a cover mounting portion 74 is formed on the rear side of the mounting bracket 71c. The lower mounting portion 25 of the headlight 20 and the front cowl 30 are screwed to the mounting plate 72 on the front side of the mounting bracket 71c. An insertion hole is formed in the cover mounting portion 74 on the rear side of the mounting bracket 71c, and the rear part of the lower cover 51 is mounted to the cover mounting portion 74 by the clip 90.

A lower arm 69 extends forward from the lower plate 64 of the frame 61, and a tip end of the lower arm 69 is fixed to the down arm 68. A reinforcing bracket 75 having a substantially biangular shape is fixed to the lower plate 64 of the frame 61, and a base end part of the lower arm 69 is supported by the reinforcing bracket 75. In this way, the front cowl 30, the headlight 20, and the lower cover 51 are stably supported by the cowl brace 60 having high rigidity. Since the headlight 20 and the lower cover 51 are mounted to the common mounting bracket 71c, the number of components can be reduced, and the mounting positions can be made compact to save space.

As shown in FIG. 5, in a rear view, mounting positions for the headlight 20 are located on both left and right sides across a mounting position for the lower cover 51 in the mounting bracket 71c. More specifically, the cover mounting portion 74 serving as the mounting position for the lower cover 51 is located at the center of the mounting bracket 71c in the left-right direction, and both end portions 73 of the mounting plate 72 serving as the mounting positions for the headlight 20 are left and right away from the center of the mounting bracket 71c. Both end portions 73 of the mounting plate 72 do not overlap the cover mounting portion 74 in a rear view, and a work space is secured on both sides of the cover mounting portion 74, so that the ease of assembly of the headlight 20 is not impaired.

Figure 6:
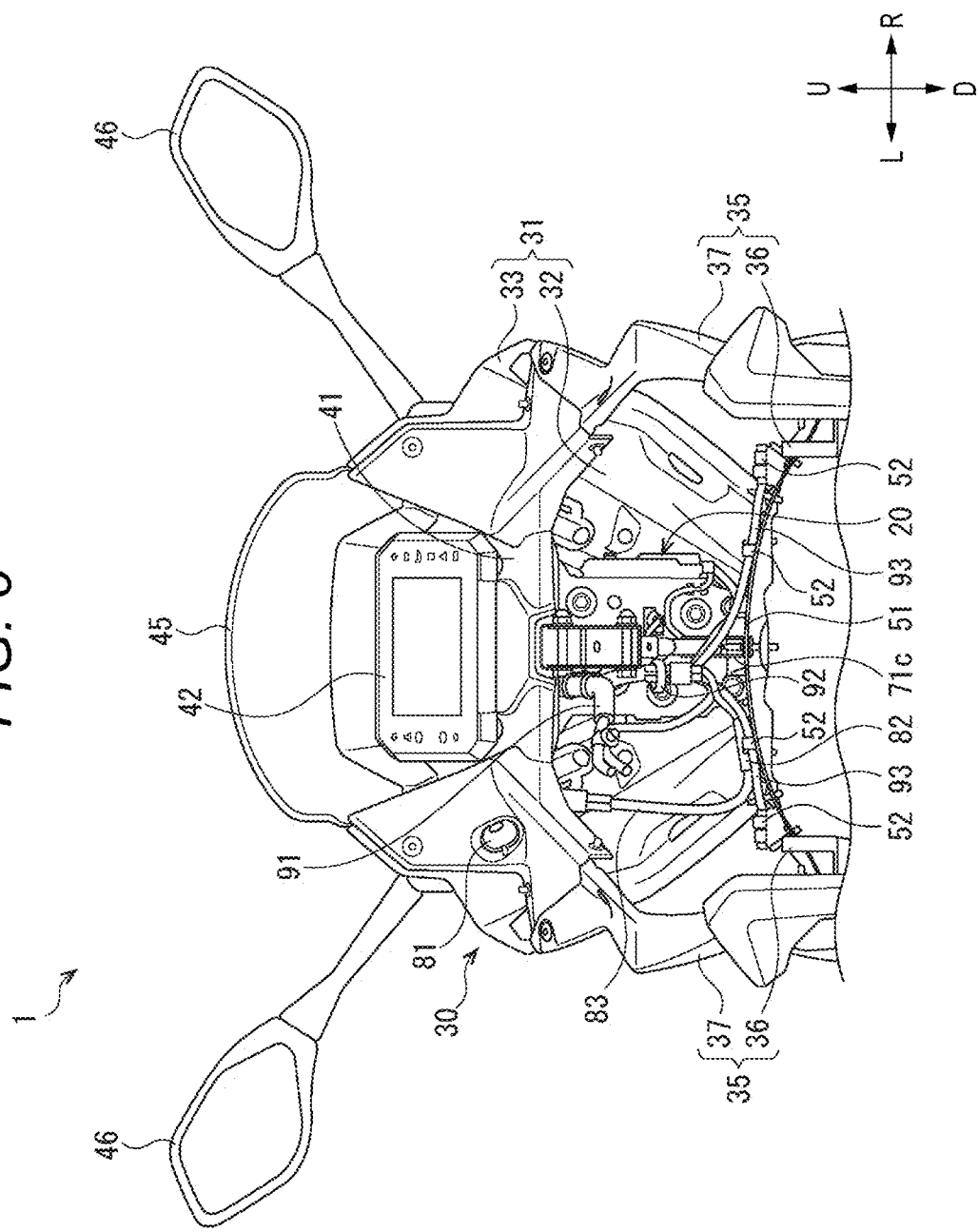
FIG. 6 is a rear view of a vehicle front structure according to the present embodiment.
Figure 7:
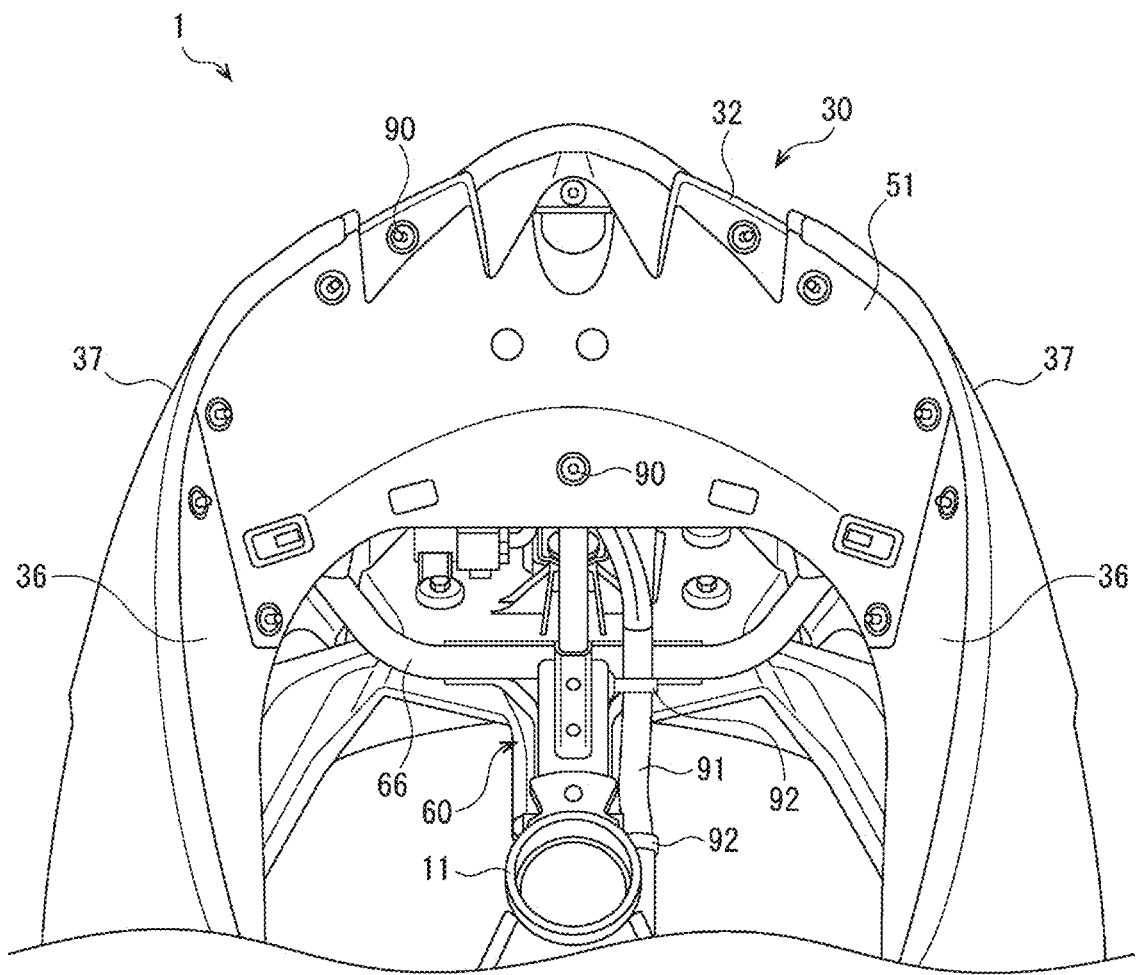
FIG. 7 is a bottom view of the vehicle front structure according to the present embodiment.
Figure 8:
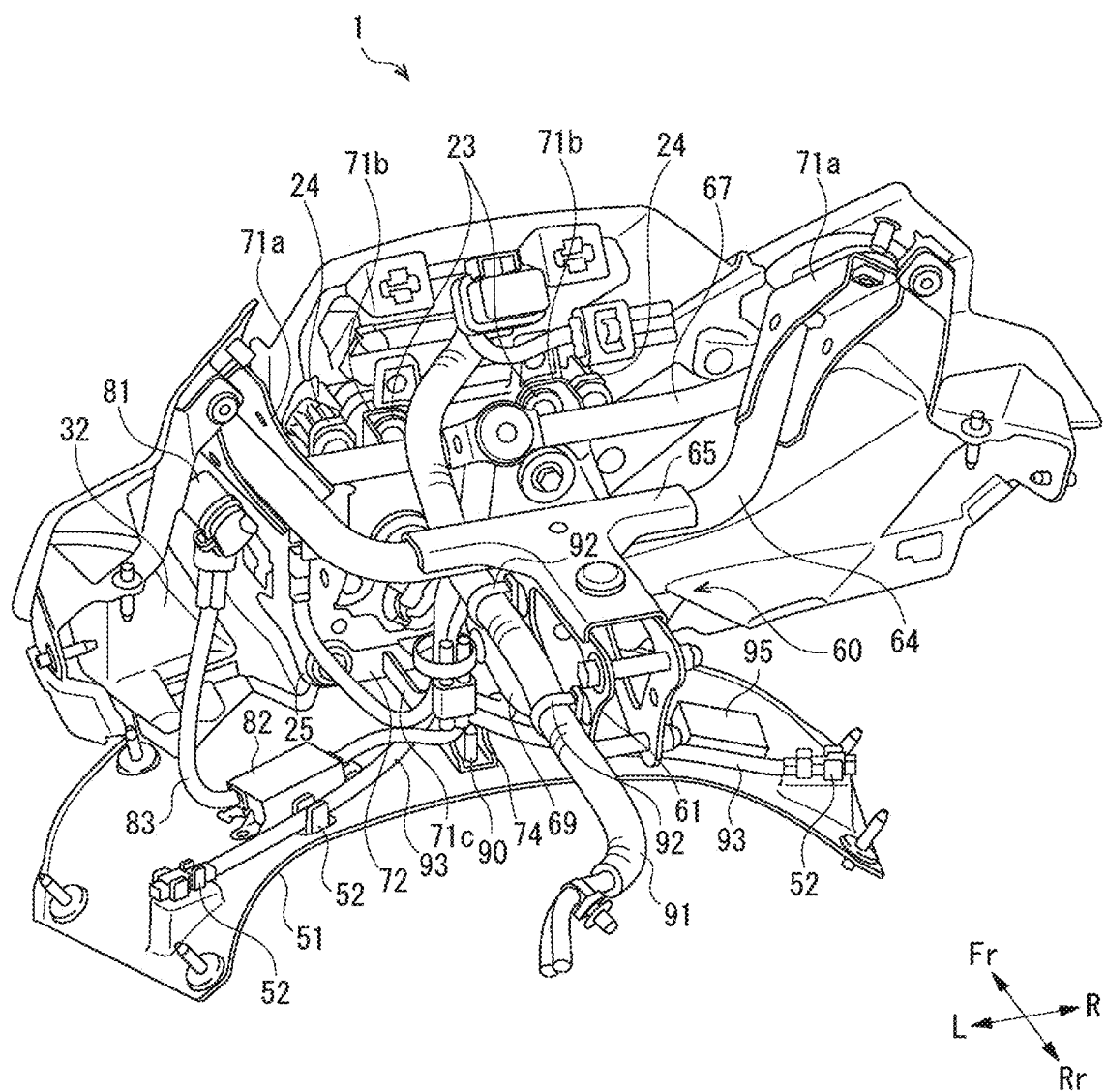
FIG. 8 is a perspective view of the vehicle front structure according to the present embodiment.

The vehicle front structure according to the present embodiment will be described with reference to FIGS. 6 to 8. FIG. 6 is a rear view of the vehicle front structure according to the present embodiment. FIG. 7 is a bottom view of the vehicle front structure according to the present embodiment. FIG. 8 is a perspective view of the vehicle front structure according to the present embodiment. In FIG. 8, the side cowl, the meter panel, and the mirrors are omitted for convenience of description.

As shown in FIG. 6, an upper surface of the front cowl 30 is covered with the meter panel 41. A meter 42 on which various kinds of information are displayed is installed at the center of an upper surface of the meter panel 41. In the meter panel 41, a universal serial bus (USB) port 81 is installed on a side (left side) of the meter 42. The USB port 81 is formed separately from a USB controller 82. The USB port 81 is installed on the meter panel 41. The USB controller 82 is installed on the upper surface of the lower cover 51. The USB port 81 is provided with a fitting claw (not shown), and the USB port 81 is mounted to an opening edge of the meter panel 41 using a snap fit method.

The front surface of the front cowl 30 is covered by the body cowl 31 of the front cowl 30, and both side surfaces of the front cowl 30 are covered by the pair of side cowls 35 of the front cowl 30. The body cowl 31 includes the upper body cowl 33 and the lower body cowl 32. The lower body cowl 32 is located on the inner side of the upper body cowl 33. The pair of side cowls 35 includes the pair of outer side cowls 37 and the pair of inner side cowls 36. The pair of inner side cowls 36 are located on the inner side of the pair of outer side cowls 37. The lower surface of the front cowl 30 is covered by the lower cover 51.

As shown in FIG. 7, the lower edge of the front cowl 30 is formed by the lower body cowl 32, the pair of outer side cowls 37, and the pair of inner side cowls 36. The front part and both left and right parts of the lower cover 51 are mounted to the lower edge of the front cowl 30 by the plurality of clips 90. Specifically, the lower cover 51 is mounted to the lower body cowl 32 by the clips 90 at three central positions on the front part of the lower cover 51, and is mounted to the pair of outer side cowls 37 by the clips 90 at two positions sandwiching the three central positions. The lower cover 51 is mounted to the pair of inner side cowls 36 by clips 90 at two positions on both left and right parts of the lower cover 51.

The rear part of the lower cover 51 is mounted to a lower portion of the cowl brace 60. The mounting position in the rear part of the lower cover 51 with respect to the lower portion of the cowl brace 60 is located at the center in the left-right direction. Specifically, the lower cover 51 is mounted to the mounting bracket 71c (see FIG. 3) of the cowl brace 60 having high rigidity by the clip 90 at one central position of the rear part of the lower cover 51. In this way, both front and rear parts and both left and right parts of the lower cover 51 are mounted to the lower body cowl 32, the pair of outer side cowl 37, the pair of inner side cowl 36, and the cowl brace 60, so that the lower cover 51 is supported in a balanced manner.

In this case, a load acts not only on the front part and both left and right parts of the lower cover 51 but also on the rear part of the lower cover 51, and the load acting on the lower cover 51 is dispersed, thereby preventing deformation of the lower cover 51. Further, since the lower cover 51 is supported at both front and rear parts and both left and right parts thereof, deformation of the lower cover 51 is restrained at both front and rear parts and both left and right parts. Although the lower cover 51 is mounted to the cowl brace 60 at one position of the rear part of the lower cover 51, deformation of the rear part of the lower cover 51 is effectively prevented by the cowl brace 60 having high rigidity. The rigidity of the lower cover 51 is improved by supporting the lower cover 51 on all sides.

As shown in FIG. 8, an upper portion of the upper body cowl 33 and the mirrors 46 (see FIG. 1) are fastened to the pair of mounting brackets 71a of the cowl brace 60 with bolts. The pair of upper mounting portions 23 of the headlight 20 are fastened to the pair of mounting brackets 71b of the cowl brace 60 by bolts. The USB port 81 is installed in the lower body cowl 32 below the left mounting bracket 71a. A space below the mounting bracket 71a is effectively used as an installation space for the USB port 81. A vertically intermediate portion of the lower body cowl 32 is fastened to the pair of cowl mounting portions 24 of the headlight 20 by bolts.

The mounting plate 72 is provided on the front side of the mounting bracket 71c of the cowl brace 60, and the pair of lower mounting portions 25 of the headlight 20 and a lower portion of the lower body cowl 32 are fastened to the mounting plate 72 by bolts. The cover mounting portion 74 is formed on the rear side of the mounting bracket 71c, and the rear part of the lower cover 51 is pinned to the cover mounting portion 74 by the clip 90. A main harness 91 is installed on the frame 61 and the lower arm 69 of the cowl brace 60 via a plurality of ring-shaped clamps 92. A plurality of cables such as a pair of winker harnesses 93 and lead wires 83 are branched from the main harness 91.

The pair of winker harnesses 93 extend along a rear edge of the lower cover 51. A plurality of clamps 52 are provided on the rear part of the upper surface of the lower cover 51, and the pair of winker harnesses 93 are held by the plurality of clamps 52. Since the rigidity of the lower cover 51 is improved, the pair of winker harnesses 93 can be held by the lower cover 51, and the ease of assembling the pair of winker harnesses 93 is improved. The lead wire 83 extends to the USB port 81, and the USB controller 82 is provided in the middle of the lead wire 83. In the present embodiment, the USB port 81 and the USB controller 82 are separated.

On the upper surface of the lower cover 51, the installation surface for electric components such as the USB controller 82 and an electronic toll collection (ETC) antenna 95 is secured on both sides of the mounting bracket 71c. Since the rigidity of the lower cover 51 is improved, the USB controller 82 and the ETC antenna 95 can be installed on the lower cover 51, and the ease of assembling the USB controller 82 and the ETC antenna 95 is improved. Thus, even if various cables and electric components are installed on the lower cover 51, deformation of the lower cover 51 is prevented. The electric components are installed on the lower cover 51 by an existing installation method such as screwing or bonding.

As described above, according to the vehicle front structure of the present embodiment, the lower cover 51 is supported by the front cowl 30 and the cowl brace 60 at both front and rear parts and both left and right parts of the lower cover 51, so that the rigidity of the lower cover 51 is improved. The cowl brace 60 having high rigidity can prevent the lower cover 51 from hanging and prevent contact between the lower cover 51 and other components.

In the present embodiment, the lower cover is supported by the front cowl and the cowl brace at both front and rear parts and both left and right parts of the lower cover of the lower cover. It is sufficient that the lower cover is supported by at least the front cowl and the cowl brace at both front and rear parts of the lower cover.

Further, in the present embodiment, the body cowl and the pair of side cowls of the front cowl are separately formed. Alternatively, the body cowl and the pair of side cowls may be integrally formed.

Further, in the present embodiment, the body cowl has a double structure including the upper body cowl and the lower body cowl. Alternatively, the body cowl may be formed by a single cowl. Similarly, the side cowl has a double structure including the outer side cowl and the inner side cowl. Alternatively, the side cowl may be formed by a single cowl.

Further, in the present embodiment, the cowl brace is formed of a metal pipe, a metal bracket, or the like, but the structure of the cowl brace is not particularly limited as long as the cowl brace can support the inner side of the front cowl from the vehicle rear side.

Further, in the present embodiment, the headlight is formed in two upper and lower stages by the upper headlight and the lower headlight. Alternatively, the headlight may be formed by a single light.

Further, the vehicle front structure according to the present embodiment is not limited to the above-described straddle-type vehicle, and may be used in other types of straddle-type vehicles. The straddle-type vehicle is not limited to a general vehicle in which a driver rides on a seat in a posture of straddling the seat, and includes a scooter-type vehicle in which the driver rides on the seat without straddling the seat.

As described above, in a first aspect, there is provided a vehicle front structure for a straddle-type vehicle (1), the straddle-type vehicle including a headlight (20) installed in a vehicle front, the vehicle front structure including: a front cowl (30) configured to cover a periphery of the headlight and having a lower surface with an opening; a cowl brace (60) configured to support an inner side of the front cowl from a vehicle rear side; and a lower cover (51) configured to cover the opening of the front cowl below the headlight, in which a front part of the lower cover is mounted to a lower edge of the front cowl, and a rear part of the lower cover is mounted to a lower portion of the cowl brace. According to this configuration, the front and rear of the lower cover are supported by the front cowl and the cowl brace, so that the rigidity of the lower cover is improved. The cowl brace having high rigidity can prevent the lower cover from hanging and prevent contact between the lower cover and other components.

In a second aspect, there is provided the vehicle front structure according to the first aspect, in which the cowl brace includes a support member (mounting bracket 71c) extending in a front-rear direction along the lower cover, the rear part of the lower cover is mounted to a rear part of the support member, and the headlight is mounted to a front part of the support member. According to this configuration, the lower cover and the headlight are mounted to the common support member, so that it is possible to reduce the number of components and save space.

In a third aspect, there is provided the vehicle front structure according to the second aspect, in which in a rear view, mounting positions for the headlight are located on left and right sides across a mounting position for the lower cover in the support member. According to this configuration, the mounting positions for the headlight do not overlap the mounting position for the lower cover in the rear view, and a work space is secured on both sides of the mounting position for the lower cover, so that the ease of assembling the headlight is not impaired.

In a fourth aspect, there is provided the vehicle front structure according to any one of the first to third aspects, in which a holding portion (clamp 52) for a harness (winker harness 93) is formed on an upper surface of the lower cover. According to this configuration, the rigidity of the lower cover is improved, so that the harness can be held by the lower cover, and the ease of assembling the harness is improved.

In a fifth aspect, there is provided the vehicle front structure according to any one of the first to fourth aspects, in which an installation surface for an electric component (USB controller 82, ETC antenna 95) is formed on an upper surface of the lower cover. According to this configuration, the rigidity of the lower cover is improved, so that the electric component can be installed on the lower cover, and the ease of assembling the electric component is improved.

In a sixth aspect, there is provided the vehicle front structure according to any one of the first to fifth aspects, in which the front cowl includes a body cowl (31) configured to cover the headlight from a front side, and a pair of side cowls (35) configured to cover the headlight from lateral sides, the front part of the lower cover is mounted to the body cowl, left and right parts of the lower cover are mounted to the pair of side cowls, respectively, and a mounting position on the rear part of the lower cover with respect to the lower portion of the cowl brace is located at a center of the lower cover in a left-right direction. According to this configuration, the rigidity of the lower cover can be improved by supporting the lower cover on all sides.

Although the present embodiment is described, a part or all of the embodiment and modifications above described may be combined as another embodiment.

The technique according to the present disclosure is not limited to the above-described embodiment, and may be variously changed, replaced, or modified without departing from the gist of the technical concept. Further, the present disclosure may be implemented by other methods as long as the technical concept can be implemented by the methods through advance of the technique or other derivative techniques. Therefore, the claims cover all embodiments that may fall within the scope of the technical concept.

What is claimed is:

1. A vehicle front structure for a straddle-type vehicle, the straddle-type vehicle comprising a headlight installed in a vehicle front, the vehicle front structure comprising:
   a front cowl configured to cover a periphery of the headlight and having a lower surface with an opening;
   a cowl brace configured to support an inner side of the front cowl from a vehicle rear side; and
   a lower cover configured to cover the opening of the front cowl below the headlight,
   wherein a front part of the lower cover is mounted to a lower edge of the front cowl, and
   wherein a rear part of the lower cover is mounted to a lower portion of the cowl brace,
   wherein the cowl brace comprises a support member extending in a front-rear direction along the lower cover,
   wherein the rear part of the lower cover is mounted to a rear part of the support member, and
   wherein the headlight is mounted to a front part of the support member.

2. The vehicle front structure according to claim 1, wherein in a rear view, mounting positions for the headlight are located on left and right sides across a mounting position for the lower cover in the support member.

3. The vehicle front structure according to claim 1, wherein a holding portion for a harness is formed on an upper surface of the lower cover.

4. The vehicle front structure according to claim 1, wherein an installation surface for an electric component is formed on an upper surface of the lower cover.

5. The vehicle front structure according to claim 1,
wherein the front cowl comprises a body cowl configured to cover the headlight from a front side, and a pair of side cowls configured to cover the headlight from lateral sides,
wherein the front part of the lower cover is mounted to the body cowl,
wherein left and right parts of the lower cover are mounted to the pair of side cowls, respectively, and
wherein a mounting position on the rear part of the lower cover with respect to the lower portion of the cowl brace is located at a center of the lower cover in a left-right direction.

* * * * *